United States Patent

[11] 3,628,341

| [72] | Inventors | Gunther Klotz<br>Krefeld-Bockum;<br>Hans Helmut Schwarz, Krefeld-Bockum,<br>both of Germany |
| --- | --- | --- |
| [21] | Appl. No. | 855,229 |
| [22] | Filed | Sept. 4, 1969 |
| [45] | Patented | Dec. 21, 1971 |
| [73] | Assignee | Farbenfabriken Bayer Aktiengesellschaft<br>Leverkusen, Germany |
| [32] | Priority | Sept. 21, 1968 |
| [33] | | Germany |
| [31] | | P 17 94 202.8 |

[54] PROCESS FOR SEPARATING AND PURIFYING CRYSTALS FROM A CRYSTAL SUSPENSION
3 Claims, 1 Drawing Fig.

[52] U.S. Cl. .................................................. 62/58, 210/71
[51] Int. Cl. .................................................. B01d 9/04

[50] Field of Search.......................................... 62/58

[56] References Cited
UNITED STATES PATENTS
3,267,686   8/1966   Holley ........................ 62/58

*Primary Examiner*—Samih N. Zaharna
*Attorney*—Burgess, Dinklage & Sprung

ABSTRACT: A process for separating and purifying crystals from a crystal suspension by filtering the crystal suspension in a filter zone of a column under the influence of pulsation, delivering the crystal cake formed to an adiabatic reflux zone in which the pure melt is used as washing liquid flowing in the countercurrent to the crystal cake, and the thus-purified crystals are melted in a melting zone from which some of the melt is run off as the end product and some is used as the washing liquid. The pressure surges are measured above the filtration zone and used to regulate the quantity in which the mother liquor runs off and hence to regulate the entire sequence of operations in the column.

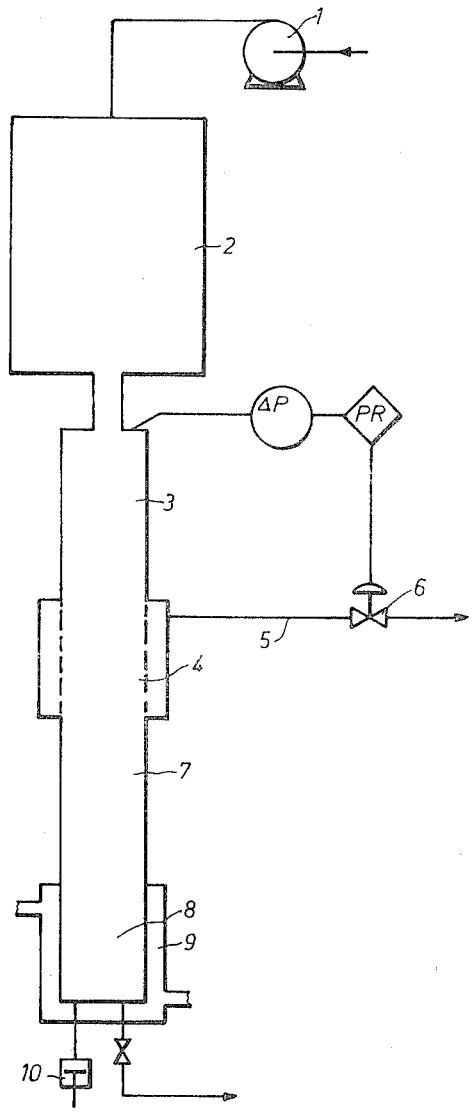
INVENTORS:
GÜNTHER KLOTZ, HANS HELMUT SCHWARZ.
BY
Burgess, Dinklage & Sprung

PROCESS FOR SEPARATING AND PURIFYING CRYSTALS FROM A CRYSTAL SUSPENSION

BACKGROUND

The process for separating and purifying crystals from a crystal suspension by fractional crystallization in columns with pulsating pressure surges is known and has been adequately described, for example, in Chem.) Eng. Progr. 61 (1965) 11, 99–104. The process comprises the following stages: the crystal slurry is filtered in a filtration zone, the resulting crystal plug is subjected to fractional counter current crystallization in an adiabatic intermediate zone and the resulting purified crystals are melted in a melting zone. Unfortunately, this process only yields a pure end product when the optimum conditions for both heat and material transfer are maintained constant.

The parameters to be kept constant are the temperature of the crystal suspension (and hence its solids content), the temperature of the product in the melting zone, and the quantity in which the pure product is run off or the quantity in which the mother liquor runs off. The heat loss of the apparatus can be another troublesome factor.

Various attempts have been made to guarantee reliable operation of the plant by complicated measures which are intended to keep the various parameters constant.

German Auslegeschrift No. 1,237,981 discloses a process in which the heat content of a crystal slurry is measured to determine its solids content, and the cooling of the crystallization apparatus is regulated by a calculator and regulator in such a way that the solids content is always kept constant. Apart from its complexity, this process involves considerable outlay and is extremely expensive.

In another process, discloses in German Auslegeschrift No. 1,218,403, heat transfer in the melting zone is regulated by using the temperature of the melt to control the supply of heat required for melting. In this process, both the quantity removed and also the temperature of the melt are kept constant. Unfortunately, irregularities in the other parameters cannot be corrected by this measure.

According to the process disclosed in U.S. Pat. No. 3,267,686, the quantity in which the mother liquor runs off is regulated by the difference in pressure between any two of three points, namely a point at which the crystal slurry is introduced into the process, a point adjacent the inlet of the filtration zone, and a point in the filtrate line. This process requires two pressure-measuring sites.

THE INVENTION

A surprisingly simple method of regulating the conditions in the column in such a way that a pure product can always be obtained, has now been found in which the intensity of pressure surges generated by a pulsator known per se is measured above the filtration zone and is used to regulate the quantity in which the mother liquor runs off and hence to regulate the entire sequence of operations in the column.

The difference between the average pressure and the pressure peaks, or alternatively the difference between the maximum pressure and the minimum pressure of the pressure surges, may be used as the control value. Variation in the temperature of the crystal suspension in the crystallizer, and hence a variation in the solids content, may readily be compensated by means of this system of regulation. The same applies when adiabatic operation is somewhat disturbed either by the supply of heat or by the loss of heat.

When throughput is increased by the removal of sump product in larger quantities, the amount of mother liquor running off is immediately adjusted in such a way that the crystal bed is kept at the requisite height. The same applies as regards a reduction in throughput.

The regulating system according to the invention not only has the advantage of being relatively simple in its structure, it only requires a single measuring site which is in a region of low-viscosity crystal suspension in which pressure is not only best measured but also easy to measure.

The process is diagrammatically illustrated by way of example in the accompanying drawing showing a crystallization column.

Referring now to the drawing a melt or solution is introduced under a predetermined pressure into a crystallizer 2 with cooling jacket (not shown) by means of a pump 1. The crystal suspension or slurry formed passes through a first column section 3 into a filter zone 4 in which most of the mother liquor is run off through a pipe 5 and valve 6. The filtered residue, containing the residual mother liquor, is converted into a crystal plug which is forced through a second column section 7 into a melting zone 8 which is surrounded by a heating jacket 9.

A pressure gradient or pulsation between the melting zone 8 and the crystallizer 2 is formed by means of the pulsator 10; and the intensity of the pulsation depends on the crystal bed which projects more or less into the first column section 3, and on the quantity of mother liquor run off. The crystal bed which produces the pressure gradient ensures that the pressure surges of the pulsator 10 pass from the sump of the melting zone 8 through the filter zone 4 into the crystallizer 2 corresponding to the damping effect.

Once the ideal operational state (steady state operation producing purified material at a desired purity and rate) has been reached, the outflow of mother liquor through the valve 6 can be adjusted in such a way that the pressure surges are always of the same intensity, i.e., a constant pressure amplitude is maintained. When the pressure surges become weaker, too much mother liquor has been removed so that the crystal bed can build up too far in the first column section 3. However, if the pressure surges increase in intensity, too little mother liquor is being run off, with the result that the crystal bed is softened. The Δ P-value (measured by ΔP means and recorded by pressure recording, PR, means shown in the FIGURE) at a measuring site above the filter zone 4 is thus an unequivocal controlling parameter for the outflow of mother liquor and hence for the satisfactory operation of the column.

We claim:

1. In a process of separating a purified material from a liquor containing the material comprising:
    a. the step of crystallizing the material from the liquor in a crystallizing zone, producing suspension of a mother liquor and crystals containing occluded mother liquor,
    b. conveying said suspension from the crystallizing zone through a first column section to a filtering zone,
    c. filtering the crystals in the filtering zone, thereby separating mother liquor therefrom, and forming a crystal cake,
    d. conveying the crystals from the filtering zone through a second column section to a melting zone,
    e. melting the crystals in the melting zone, withdrawing part of the melt from the melting zone as said purified material, imparting pulsation to the melt to pass part of the melt through the crystal cake in the second column section to the filtering zone for countercurrent refluxing of the crystal cake to separate occluded mother liquor therefrom, the improvement which comprises:
    determining the intensity of pulsation in said suspension at a location upstream of the filtration zone for steady state operation wherein purified material of substantially constant purity is produced at a substantially constant flow rate, sensing at said location deviation in the intensity of pulsation in the suspension from the intensity of pulsation at said steady state, and varying the rate of withdrawal of mother liquor from the filtration zone to correct said deviation.

2. Process according to claim 1, wherein for sensing the deviation the difference between the average pressure and the pressure peaks of pulsation is measured.

3. Process according to claim 1, wherein for sensing the deviation the difference between the maximum pressure and the minimum pressure of pulsation is measured.

* * * * *